United States Patent
Wright

(10) Patent No.: US 6,800,209 B2
(45) Date of Patent: Oct. 5, 2004

(54) ENERGY DISSIPATING INLET FOR CLARIFIER FEEDWELLS

(75) Inventor: Russell C. Wright, Sandy, UT (US)

(73) Assignee: WesTech Engineering, Inc., Salt Lake City, UT (US)

(*) Notice: Subject to any disclaimer, the term of this patent is extended or adjusted under 35 U.S.C. 154(b) by 0 days.

(21) Appl. No.: 10/208,235

(22) Filed: Jul. 30, 2002

(65) Prior Publication Data

US 2004/0020847 A1 Feb. 5, 2004

(51) Int. Cl.[7] .............................................. B01D 21/24
(52) U.S. Cl. ....................... 210/801; 210/519; 210/528; 210/532.1
(58) Field of Search ................................ 210/800, 801, 210/519, 525, 528, 532.1, 538, 540

(56) References Cited

U.S. PATENT DOCUMENTS

| | | | |
|---|---|---|---|
| 2,702,124 A | 2/1955 | Stengel | |
| 3,006,474 A | 10/1961 | Fitch | |
| 3,175,692 A | 3/1965 | Vrablik | |
| 3,216,570 A | 11/1965 | Cunetta | |
| 3,486,628 A | * 12/1969 | Darby | 210/528 |
| 3,539,051 A | * 11/1970 | Stone | 210/528 |
| 3,770,131 A | * 11/1973 | Davis et al. | 210/519 |
| 3,926,805 A | 12/1975 | Walker | |
| 4,270,676 A | 6/1981 | Green | |
| 5,378,378 A | * 1/1995 | Meurer | 210/519 |
| 6,276,537 B1 | 8/2001 | Esler et al. | |

* cited by examiner

Primary Examiner—Christopher Upton
(74) Attorney, Agent, or Firm—Shook, Hardy & Bacon L.L.P.

(57) ABSTRACT

An inlet structure for dissipating the energy of the influent to a feedwell of a clarifier. The inlet structure has a cylindrical wall centered in the clarifier and closed at the bottom. Ports in the wall are each equipped with a baffle that includes a fixed center vane aligned with the port, a pair of hinged gates on the sides of the center vane, and a bottom baffle underlying the port and the center vane and gates. The gates can be adjusted to control the size and velocity of influent streams that are directed in opposite tangential directions from each port into impingement with streams from adjacent ports for dissipation of the influent energy in the feedwell.

22 Claims, 1 Drawing Sheet

ENERGY DISSIPATING INLET FOR CLARIFIER FEEDWELLS

FIELD OF THE INVENTION

This invention relates generally to water and wastewater treatment and more particularly with clarifiers used for clarifying water and wastewater through flocculation and settlement of solids. Still more particularly, the invention is directed to a method and apparatus for dissipating the energy of the influent that is directed into the feedwell of a clarifier in order to enhance flocculation of the influent.

BACKGROUND OF THE INVENTION

In the treatment of water and wastewater, clarifiers are commonly used for settling of floc in order to clarify the liquid. The influent is typically introduced into the clarifier through an influent feed structure that may take the form of a central influent column, a feed pipe, or a feed trough. A feedwell that takes the form of a cylindrical ring generally centered in the clarifier initially receives the influent. In order to enhance flocculation of the influent and promote settling of the floc, it is helpful to minimize the energy of the influent that enters the feedwell.

Various types of energy dissipating feedwells and devices for dissipating the energy of the influent entering the feedwell have been proposed. For example, U.S. Pat. No. 6,276,537 to Esler discloses a feedwell which is closed at the bottom and equipped with pipes that extend from the bottom of the feedwell and direct the flow that discharges from the feedwell in opposite directions. In a configuration of this type, the dissipation of energy takes place well below the feedwell and outside of its confines rather than within the feedwell. Thus, the flocculation time is reduced compared to a situation where the energy dissipation occurs within the feedwell, and the flocculation suffers accordingly.

Other configurations promote swirling of the influent within the feedwell, as exemplified by U.S. Pat. No. 3,926,805 to Walker, U.S. Pat. No. 3,216,570 to Cunetta and U.S. Pat. No. 3,006,474 to Fitch. Influent that moves in a swirling pattern has significant energy that can result in a short circuit flow and improper flocculation. Other efforts to dissipate energy are disclosed in U.S. Pat. No. 3,175,692 to Vrablik and U.S. Pat. No. 2,702,124 to Stengel, neither of which has been commercially successful. Adjustable feedwell ports such as those shown in U.S. Pat. No. 4,270,676 to Green have been proposed but have not been particularly effective in promoting flocculation.

BRIEF SUMMARY OF THE INVENTION

The present invention is directed to an inlet structure that is installed within a feedwell and constructed to dissipate the energy of the influent in order to inhibit short circuiting of the clarification process and enhance flocculation, along with a method employed in the dissipation of energy.

It is an object of the invention to provide, in a clarifier feedwell, an energy dissipating inlet which is improved in its ability to dissipate energy and enhance flocculation.

Another object of the invention is to provide a method of dissipating influent energy by directing streams of influent tangentially in opposite directions into impingement with other streams in a manner to dissipate energy due to interaction between the impinging and oppositely directed influent streams.

A further object of the invention is to provide an energy dissipating inlet of the character described in which the degree of impingement and influent velocity at the time of impingement can be controlled through simple adjustments.

An additional object of the invention is to provide an energy dissipating inlet of the character described that is simple and economical to construct and install and useful with a wide variety of feedwells and clarifier configurations.

In accordance with a preferred embodiment of the invention, an inlet structure for a feedwell includes a cylindrical wall and a closed bottom. The inlet structure is installed within and generally centered in the feedwell in order to receive the influent discharged into the clarifier basin from the influent feed structure. The wall of the inlet structure is provided with ports that are spaced apart circumferentially and equipped with baffles arranged to direct the influent tangentially in opposite directions. The influent streams impinge with oppositely directed streams from the adjacent ports in order to dissipate their energy as the influent enters the feedwell. Accordingly, the energy is dissipated within the feedwell, and adequate time for effective flocculation is provided.

Preferably, each baffle is constructed with a fixed center vane located immediately in front of the port, two hinged gates on the opposite sides of the center vane, and a bottom baffle extending beneath the port and underlying the center vane and both gates. The gates can be swung inwardly to direct the streams of influent closer to the inlet wall and increase the velocity due to the decrease in area. Conversely, the gates can be adjusted outwardly to decrease the velocity and create a larger area of impingement between the influent streams.

Other and further objects of the invention, together with the features of novelty appurtenant thereto, will appear in the course of the following description.

BRIEF DESCRIPTION OF THE SEVERAL VIEWS OF THE DRAWING

In the accompanying drawings which form a part of the specification and are to be read in conjunction therewith and in which like reference numerals are used to indicate like parts in the various views.

DETAILED DESCRIPTION OF THE INVENTION

Figure 1:
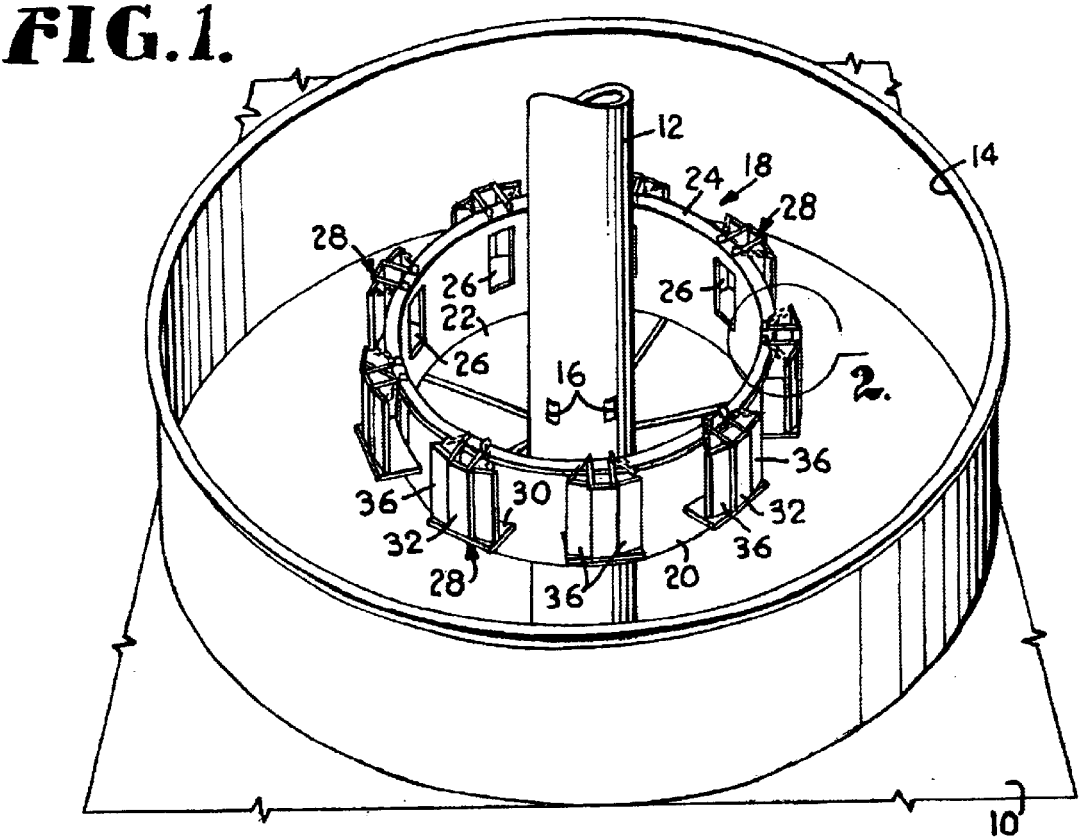
FIG. 1 is a perspective view showing a feedwell and influent column in a clarifier basin and equipped with an energy dissipating inlet structure constructed according to a preferred embodiment of the present invention.

Referring now to the drawings in more detail and initially to FIG. 1, the present invention relates generally to clarifiers of the type used for the clarification of water and wastewater. Such clarifiers include a large clarifier tank or basin having a floor such as the floor indicated by numeral 10 in FIG. 1. The clarifier basin has a suitable outlet for the clarified liquid and is typically provided with a mechanism for handling sludge and other settled material. A vertical influent column 12 is located at the center of the clarifier basin and receives the influent that is to be treated in the clarifier basin. A feed pipe or feed trough (not shown) may be used in place of the column 12. A cylindrical feedwell 14 is installed in the basin around the influent column 12 and is open at the bottom so that the influent within the feedwell can flow beneath the lower edge of the feedwell into the remainder of the clarifier basin. The influent column 12 is provided with a series of ports 16 which admit the influent into the clarifier basin at a location within the feedwell 14.

In accordance with a preferred embodiment of the present invention, an energy dissipating inlet structure which is generally identified by numeral 18 is installed within the feedwell 14. The inlet structure 18 has a generally cylindrical wall 20 which is centered on the axis of the influent column 12. The inlet structure 18 has a bottom panel 22 which closes the wall 20 at its bottom and presents a chamber in the inlet structure within the wall 20. The upper edge of the wall 20 is provided with an out turned flange 24. The wall 20 has a plurality of rectangular ports 26 formed through the wall and spaced apart circumferentially. The spacing between the adjacent ports 26 is uniform.

Figure 2:
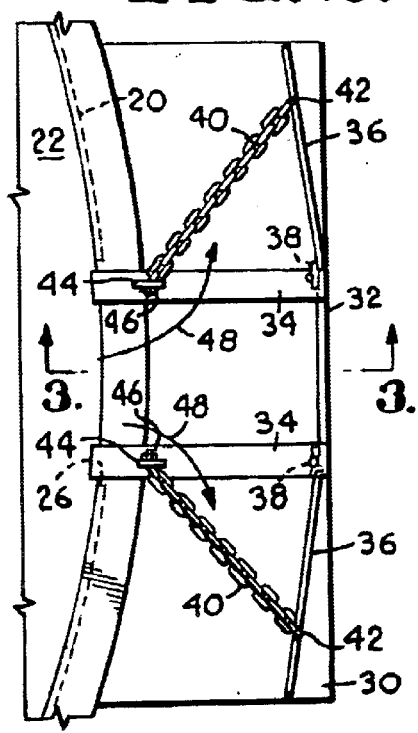
FIG. 2 is a fragmentary top plan view on an enlarged scale of the detail identified by numeral 2 in FIG. 1.
Figure 3:
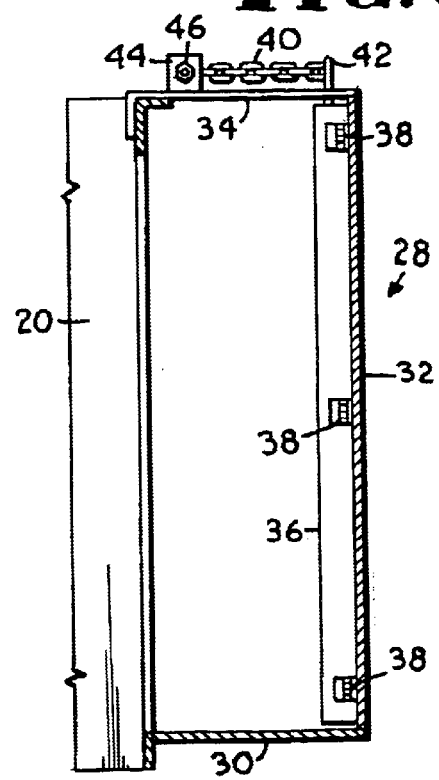
FIG. 3 is a fragmentary cross-sectional view taken generally along line 3—3 of FIG. 2 in the direction of the arrows.

Each of the ports 26 is provided with a baffle assembly which is generally identified by numeral 28. Each of the baffle assemblies 28 includes a bottom baffle 30 which may take the form of a substantially rectangular plate extending outwardly from the wall 20 at a location immediately beneath the corresponding port 26. The bottom baffles 30 maybe horizontal plates welded or otherwise secured to the wall 20. Each baffle assembly 28 also includes a fixed center vane 32 which extends upwardly from the outer edge of the bottom baffle 30 at its center portion. The fixed center vanes 32 are spaced directly outwardly from the ports 26 and may have a width substantially equal to the width of the port 26. Preferably, the vanes 32 extend upwardly to a location near the top edge of the wall 20. As shown additionally in FIGS. 2 and 3, a pair of mounting straps 34 are used to secure the upper edges of the vanes 32 to the flange 24 on the top edge of wall 20. The straps 34 are spaced apart and parallel to one another and extend horizontally between the top edge of vane 32 and the flange 24. The straps 34 are preferably located adjacent to the opposite side edges of the center vanes 32.

Each baffle assembly 28 also preferably includes a pair of hinged gates 36 which are secured for pivotal or hinged movement to the respective side edges of the center vane 32. A plurality of hinges 38 (see FIG. 3 in particular) are provided for each of the gates 36 and provide vertical hinge axes about which the gates 36 can swing relative to the fixed center vane 32. The gates 36 extend sidewardly well beyond the edges of the ports 26.

The angular position of each gate 36 can be adjusted. Although any suitable manual or automatic means can be used, one mechanism that operates in a satisfactory manner includes a flexible chain 40 for each gate 36. One end of each chain 40 is secured by a suitable fastener 42 to the top edge of gate 36 at a location outboard of the pivot axis provided by the hinges 38. The chains 40 may have selected links releaseably connected to lugs 44 mounted to extend upwardly from the inside end portions of the mounting straps 34. Hooks 46 or other suitable fasteners can be used to secure the selected link to the lug 44, thus limiting the extent to which the gates 36 can swing outwardly or away from the inlet wall 20.

In operation of the clarifier, the influent liquid passes through the influent column 12 and discharges through ports 16 to the interior region of the inlet structure 18. The liquid level in the clarifier basin is preferably maintained at a level below the upper edge of the wall 20 of the inlet structure. The influent that enters the inlet structure 18 passes outwardly through the ports 26 in equal quantities. Due to the presence of the baffles 28, the influent is directed in opposite directions by the fixed center vane 32 and the adjustable gates 36, as indicated by the directional arrows 48 in FIG. 2. The baffle structure directs the influent in two oppositely directed streams that are generally tangential to the inlet wall 20.

The ports 26 are located closely enough together that the streams flowing in opposite tangential directions from each port 26 encounter and impinge head on with oppositely directed streams from the adjacent ports 26, thus creating interaction between the impinging streams and thereby effectively dissipating their energy as the influent enters the feedwell 14 through the ports 26. Consequently, short circuiting of the flow is inhibited, the flocculation time is maximized, and the flocculation is enhanced accordingly.

The adjustability of the gates 36 allows the area of impingement of the oppositely directed streams of influent and the velocity at the time of the impingement to be controlled as desired. The gates 36 can be swung outwardly from the positions shown in FIG. 2 to increase the distance between their outer edges and the surface of wall 20 in order to decrease the velocity of the influent in each stream and increase the area of impingement between opposing streams. Conversely, the gates 36 can be swung inwardly to move their outer edges closer to the wall 20 in order to increase the velocity of the streams and decrease the stream areas that impinge. In this manner, the flexibility of the process is enhanced.

The gates 36 can be adjusted and fixed at the adjusted position by hooking selected links of the chains 40 on the hooks 46 to prevent the gates from opening farther than the effective length of the chain allows.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An inlet structure for directing influent liquid into a clarifier feedwell having an influent feed structure for receiving the influent liquid, said inlet structure comprising:

a generally cylindrical wall and a bottom cooperating to present a chamber in the feedwell for receiving the influent liquid from the influent feed structure, said wall having a plurality of ports for discharging the influent liquid from said chamber into the feedwell; and a baffle structure on said wall for each port arranged to direct the influent liquid passing through each port in opposite directions generally tangentially to said wall.

2. An inlet structure as set forth in claim 1, wherein:

said baffle structure for each port is arranged to direct the influent liquid in opposite flowing streams; and said ports are spaced closely enough apart that the streams from adjacent ports impinge on each other.

3. An inlet structure as set forth in claim 1, wherein each baffle structure includes a bottom baffle on said wall at a location below each port.

4. An inlet structure as set forth in claim 3, wherein said bottom baffles extend sidewardly beyond side edges of said ports.

5. An inlet structure as set forth in claim 1, wherein said baffle structure for each port comprises a pair of adjustable gates for deflecting the influent liquid in opposite directions, each gate being adjustable to direct the influent liquid more closely along or farther away from said wall.

6. An inlet structure as set forth in claim 1, wherein said baffle structure comprises:
   a pair of adjustable gates for directing the influent in opposite directions; and
   a substantially vertical axis on which each gate is mounted to pivot toward and away from said wall to thereby adjust how closely along said wall each gate directs the influent liquid.

7. An inlet structure as set forth in claim 6, wherein each baffle structure includes a fixed center vane spaced directly outwardly of each port, said gates being located on opposite sides of said center vane.

8. An inlet structure as set forth in claim 7, wherein each baffle structure includes a bottom baffle on said wall extending below each port and underlying both gates and said center vane.

9. An inlet structure as set forth in claim 6, wherein each gate can be releaseably secured at a plurality of different pivotal positions about said axis for the gate.

10. In a clarifier having an influent feed structure for receiving influent and a feedwell, the improvement comprising:
    a generally cylindrical wall substantially centered in the clarifier and a bottom cooperating with said wall to provide a chamber in the feedwell for receiving the influent from the influent feed structure;
    a plurality of ports in said wall for discharging the influent from said chamber into the feedwell; and
    a baffle for each port located to direct the influent passing through the port in oppositely directed streams, said ports being arranged such that each stream impinges with a stream from an adjacent port to dissipate the energy of the streams entering the feedwell.

11. An improvement as set forth in claim 10, including a bottom baffle element on said wall at a location below each port and underlying said baffle.

12. An improvement as set forth in claim 11, wherein each baffle includes a pair of adjustable gates each mounted for pivotal movement about a substantially vertical axis for adjustment of how closely along said wall the streams are directed.

13. An improvement as set forth in claim 10, wherein each baffle includes a pair of adjustable gates each mounted for pivotal movement about a substantially vertical axis for adjustment of how closely along said wall the streams are directed.

14. An improvement as set forth in claim 13, wherein each baffle includes a fixed center vane spaced directly outwardly of each port, said gates being located on opposite sides of said center vane.

15. An improvement as set forth in claim 13, wherein each gate can be releaseably secured at a plurality of different pivotal positions about said axis for the gate.

16. A clarifier comprising:
    a clarifier basin;
    an influent feed structure for directing influent into said basin;
    an open bottom feedwell generally centered in the clarifier;
    an inlet structure having a generally cylindrical wall and a bottom cooperating to provide a chamber in the feedwell for receiving influent, said wall having a plurality of circumferentially spaced ports for directing influent into said feedwell; and
    a baffle for each port located outwardly thereof and extending beyond opposite sides of each port to direct the influent tangentially from each port in opposite directions into impingement with influent from adjacent ports for dissipation of the influent energy.

17. A clarifier as set forth in claim 16, wherein each baffle includes a fixed bottom section located on said wall below each port.

18. A clarifier as set forth in claim 16, wherein each baffle includes a pair of pivotal gates each mounted to pivot in and out about a substantially vertical axis to adjust how closely along said wall the influent is directed by each gate.

19. A clarifier as set forth in claim 18, wherein each baffle includes a fixed center vane spaced directly outwardly of each port, said gates being located on opposite sides of said center vane.

20. A clarifier as set forth in claim 19, wherein each baffle includes a fixed bottom section located below each port and underlying said gates and center vane.

21. A method of dissipating energy of influent entering a feedwell in a clarifier, said method comprising:
    providing a substantially cylindrical chamber in the feedwell; and
    discharging influent from said chamber into the feedwell at a plurality of circumferentially spaced locations and in oppositely directed generally tangential directions with said locations being at substantially the same elevation and selected to effect direct and substantially head on impingement of the influent discharged from adjacent locations, thereby dissipating the energy of the influent entering the feedwell.

22. A method as set forth in claim 21, including the step of substantially closing said chamber at the bottom thereof.

* * * * *